(12) United States Patent
Zuluaga et al.

(10) Patent No.: US 10,216,426 B2
(45) Date of Patent: Feb. 26, 2019

(54) HIGHLY SCALABLE STORAGE ARRAY MANAGEMENT WITH REDUCED LATENCY

(71) Applicant: Oracle International Corporation, Redwood City, CA (US)

(72) Inventors: Juan Carlos Zuluaga, Somerville, MA (US); Alka Deshpande, Westford, MA (US); Mark Vetter, Holden, MA (US)

(73) Assignee: Oracle International Corporation, Redwood City, CA (US)

( * ) Notice: Subject to any disclaimer, the term of this patent is extended or adjusted under 35 U.S.C. 154(b) by 96 days.

(21) Appl. No.: 15/355,966

(22) Filed: Nov. 18, 2016

(65) Prior Publication Data

US 2017/0068463 A1 Mar. 9, 2017

Related U.S. Application Data

(63) Continuation of application No. 13/495,232, filed on Jun. 13, 2012, now Pat. No. 9,513,807.

(51) Int. Cl.
*G06F 3/06* (2006.01)

(52) U.S. Cl.
CPC .......... *G06F 3/0611* (2013.01); *G06F 3/0605* (2013.01); *G06F 3/067* (2013.01); *G06F 3/0629* (2013.01); *G06F 3/0665* (2013.01); *G06F 3/0689* (2013.01)

(58) Field of Classification Search
CPC .... G06F 3/0611; G06F 3/0605; G06F 3/0629; G06F 3/0665; G06F 3/067; G06F 3/0689
See application file for complete search history.

(56) References Cited

U.S. PATENT DOCUMENTS

| | | | |
|---|---|---|---|
| 6,742,059 B1 * | 5/2004 | Todd | H04L 41/046 709/219 |
| 8,250,401 B2 | 8/2012 | Olster | |
| 8,756,338 B1 | 6/2014 | Potakamuri | |
| 2003/0101383 A1 | 5/2003 | Carlson | |
| 2004/0230556 A1 | 11/2004 | Mueller | |
| 2009/0044193 A1 * | 2/2009 | Gilgen | G06F 9/5027 718/102 |
| 2011/0202790 A1 | 8/2011 | Rambo | |

* cited by examiner

*Primary Examiner* — Eric Cardwell

(74) *Attorney, Agent, or Firm* — Marsh Fischmann & Breyfogle LLP; Jonathon A. Szumny

(57) ABSTRACT

Systems and methods for increasing scalability and reducing latency in relation to managing large numbers of storage arrays of a storage network. Separate, dedicated, communication channels may be established between an array manager running on a server and each of a number of storage arrays for respectively performing reading and writing operations to limit the delays imposed by repeated array connection setup and teardown and improve array communication stability (e.g., as compared to performing read/write operations over the same array connection). The read connection can be used to maintain current state information (e.g., volumes, capacities, and the like) for a plurality of storage arrays in a local cache of the array manager that can be quickly accessed by the array manager, such as for presenting substantially current, summary-type state information of the various storage arrays to a user (e.g., upon the user requesting to configure a particular storage array).

16 Claims, 5 Drawing Sheets

HIGHLY SCALABLE STORAGE ARRAY MANAGEMENT WITH REDUCED LATENCY

CROSS REFERENCE TO RELATED APPLICATION

This application is a continuation of U.S. patent application Ser. No. 13/495,232, entitled "HIGHLY SCALABLE STORAGE ARRAY MANAGEMENT WITH REDUCED LATENCY," and filed on Jun. 13, 2012, the entire contents of which is incorporated herein in its entirety as if set forth in full.

BACKGROUND

1. Field of the Invention

The present invention generally relates to the management of storage area networks, and more particularly, to systems and methods that achieve increased scalability and reduced latency while managing large numbers of storage arrays.

2. Relevant Background

Storage systems such as storage arrays, disk arrays and the like typically use special hardware and software along with disk and/or tape drives to provide fast and reliable storage for computing and data processing. Storage systems may be complex and thought of as a special purpose computer designed to provide storage capacity along with advanced data protection features. Generally, storage systems can provide either block accessed storage delivered over protocols, such as Fibre Channel, Internet Small Computer System Interface (iSCSI), or Fiber Connectivity (FICON), or file accessed storage provided over protocols such as Network File System (NFS) or Common Internet File System (CIFS) protocols.

To provide access to a large volume of block level data storage, storage area networks (SANs) can be used to interconnect a large number of storage systems or devices (e.g., disk arrays, tape libraries, and the like) to one or more servers so that the storage devices appear as locally attached devices to the operating system(s) of the one or more servers. Client devices can then access the storage systems via the servers via one or more networks (e.g., LAN, WAN, SAN, Internet, and/or the like). Sharing storage usually simplifies storage administration and adds flexibility as, for instance, cables and storage devices generally do not have to be physically moved to shift storage from one server to another. A storage network typically includes one or more "array managers" (e.g., storage management software implemented as instances on the one or more servers) that allow for management of the plurality of storage devices. For instance, Oracle's Sun Storage Common Array Manager (CAM) includes a number of interfaces (e.g., browser interface, common line interface (CLI), and the like) that may be accessed from a client device and that allow users to configure storage arrays (e.g., provisioning or allocating storage from particular disk arrays to one or more volumes), monitor storage arrays (e.g., in relation to current state/health of arrays, errors, and alerts), and the like.

SUMMARY

New or additional storage arrays to a particular network typically need to be "registered" with the array manager in a manner akin to installing a new printer on a workplace network (e.g., via logically representing the array to the array manager). However, array managers can sometimes experience slowdowns and timeouts due to a user attempting to register more than a particular number of arrays (e.g., 10 arrays, 15 arrays, or more) with the array manager. For instance, a user accessing an array manager (e.g., via a user browser on a client machine) to configure one or more arrays (e.g., add/update/delete one or more volumes) is typically first presented with some sort of summary-type screen or page that provides the user with the current configuration state of each array registered with the array manager (e.g., in relation to volume usage, capacity allocations, and the like). To populate and generate the summary screen, array managers typically are required to separately communicate with each array to collect such configuration "state" information at the time the summary page is to be generated.

That is, upon a user desiring to reconfigure one or more of the storage arrays, the array managers subsequently reach out to each of the various storage arrays to obtain current state information for such storage arrays. However, substantial amounts of time and bandwidth are consumed as part of having to separately collect such configuration state information from each storage array after the user desires to perform a storage array reconfiguration or the like. This can lead to interface timeouts, the inability of users to view all state data on a single page, inconsistent results, long wait times, and the like. Such inefficiencies become more pronounced with an increasing number of storage arrays in the SAN or other type of storage network.

In this regard, disclosed herein are systems and methods that function to cache state information (e.g., in relation to storage array configurations, faults, and health) for the various storage arrays of a SAN or other storage network in a local cache that is directly accessible by any modules that configure the storage arrays, such as by each of one or more array managers of the SAN. More specifically, an array manager can, at the time the state information is needed, retrieve data for a storage array summary page directly from the quickly accessible cache instead of having to separately communicate with each storage array for its respective state information. The local cache can be refreshed in various manners according to any appropriate schedule and/or according to one of various occurrences so that the array manager or other module reading the cache has access to substantially real-time state information for the various storage arrays. In one arrangement, at least some of the state information in the local cache can be updated/refreshed in an event-driven manner independent of the time the state information is needed (e.g., for preparing a summary page), such as upon each respective configuration change of a particular storage array (e.g., in relation to disk utilization). In the case that many configuration changes to a particular storage array are made in sequence, the last or most recent state may be retrieved to improve communication efficiency.

In one aspect, a method for use in managing a plurality of storage arrays in a storage network includes receiving, at an array manager over at least a first network, a request to configure at least a first of the storage arrays; accessing, in response to the receiving, configuration state information for the plurality of storage arrays from a cache of the array manager; and sending the storage array configuration state information over the first network for presentation to a user.

Furthermore, previous/current read and write operations between an array manager and a particular storage array are performed over the same connection or thread. Stated differently, current storage networks typically allow for a static number of connections or threads to be established between an array manager and each of the plurality of storage arrays, where each connection is used for both read and write operations between the array manager and the storage array. Also, each such connection is opened or set up for reading/writing operations and then torn down upon completion of the operations. However, this arrangement often leads to various communication failures and delays. In some situations, all connections to a storage array may become consumed and thus prevent a desired operation from commencing. For instance, all connections to a particular storage array may become consumed by read operations thus preventing a write operation from occurring. Still further, numerous delays and other communication errors associated with the continual setup and teardown of array connections often occur. Having to continually recover from lost communication failures creates delays and latency in response time with regard to a particular array configuration change, read/write operation, and/or the like.

In this regard, disclosed herein are systems and methods that persist one or more array connections for an extended period of time (e.g., a period of time longer than that required for a particular read/write operation) in order to service multiple requests in sequence and avoid, or at least limit, the delays imposed by repeated array connection setup and teardown. Furthermore, separate connections may be respectively used for read operations (e.g., to satisfy user requests as part of maintaining array manager cache coherence and the like) and write operations to improve array communication stability (e.g., as compared to performing read and write operations over the same array connection).

In another aspect, a method for use in managing a plurality of storage arrays in a storage network includes receiving, at an array manager over at least a first network, at least a first request to configure at least a first of the storage arrays; selecting, from a thread pool including a plurality of storage array handlers and accessible to the array manager, a handler corresponding to the first storage array; first using the selected handler to configure the first storage array according to the first request; and second using the selected handler to obtain current state information from the first storage array in response to the first using. For instance, the first using may include configuring the first storage array according to the first request over a first write connection established between the selected handler and the first storage array via at least a second network, and the second using may include obtaining the first storage array current state information over a read connection established between the selected handler and the first storage array via the at least second network, where the read connection is distinct from the first write connection.

In one arrangement, a particular storage array may be quickly "probed" to determine whether the array is available (e.g., one or more IP addresses of a controller of the array) before attempting to establish a read and/or write connection with the storage array. For instance, the array manager may probe the storage array using a standard application programming interface (API) (e.g., a standard Java API) to initially determine whether the array is available (e.g., for read/write operations). If the array is available, the array manager may then proceed to establish a persistent array connection with the storage array (e.g., using a storage array vendor-specific API), perform any appropriate management operations, and cache the connection for future use. If the array is not available, the array manager may then proceed to probe additional storage arrays (e.g., with the standard API) to determine whether such storage arrays are available and then appropriately establish persistent array connections depending upon the availability. Significant quantities of time can be saved by quickly initially probing a storage array (e.g., with a standard API) to determine whether or not the array is available (e.g., 2-4 seconds) as opposed to proceeding directly to attempting establishment of a read/write connection with a particular storage array (e.g., with a storage array vendor-specific API) and then waiting for the connection to fail (e.g., 10 or more seconds). For instance, an array manager can move much more quickly through a long list of storage arrays when several of the arrays may be experiencing network communication failures.

Certain management operations (e.g., in relation to volume creation) may require connection to a particular controller of a storage array rather than to any of a number of controllers of the storage array. In this regard, the array manager may in some arrangements be configured to probe only the IP addresses of one or more particular controllers of a storage array (i.e., as opposed to necessarily probing all IP addresses regardless of controller). In the event that an array connection to an IP address of a desired particular controller is already cached and indexed by the desired particular controller, an operation on the particular controller can substantially seamlessly be performed by accessing the cached connection.

In another aspect, a system is provided for use with an array manager configured to manage a plurality of storage arrays of a storage model. The system includes a processing module and a memory module logically connected to the processing module. The processing module includes a set of computer readable instructions executable by the processing module to probe a first storage array of the plurality of storage arrays using a standard application programming interface (API) to determine whether or not the first storage array is available. Then, responsive to the first storage array being available, one of a plurality of threads of a thread pool is used to establish a write connection between the array manager and the first storage array. Often, the write connection is used to configure the first storage array. The processing module then may probe, responsive to the first storage array being unavailable, a second storage array of the plurality of storage arrays using the standard API to determine whether or not the second storage array is available.

In addition to the exemplary aspects and embodiments described above, further aspects and embodiments will become apparent by reference to the drawings and by study of the following descriptions.

DETAILED DESCRIPTION

The present disclosure is generally directed to systems and methods that allow for increased scalability and reduced latency in relation to managing large numbers of storage arrays of a storage area network. Separate, dedicated, and persistent communication channels or connections may be established between an array manager running on a server and each of a number of storage arrays for respectively performing reading and writing operations to limit the delays imposed by repeated array connection setup and teardown and improve array communication stability (e.g., as compared to performing read and write operations over the same array connection). The read connection can be used to maintain current state information (e.g., volumes, health, and the like) for a plurality of storage arrays of a SAN (or other network) in a local cache of the array manager. The state information can be quickly accessed by the array manager or other module, such as for use in presenting substantially current, summary-type state information of the various storage arrays to a user (e.g., upon the user requesting to configure a particular storage array, such as to add a file, request more space, and the like). The local cache can be refreshed in various manners according to any appropriate schedule and/or according to one of various events or occurrences (e.g., changes in array state or configuration, such as change in disk utilization) so that the array manager or other module reading the cache has access to substantially real-time state information for the various storage arrays.

Figure 1:
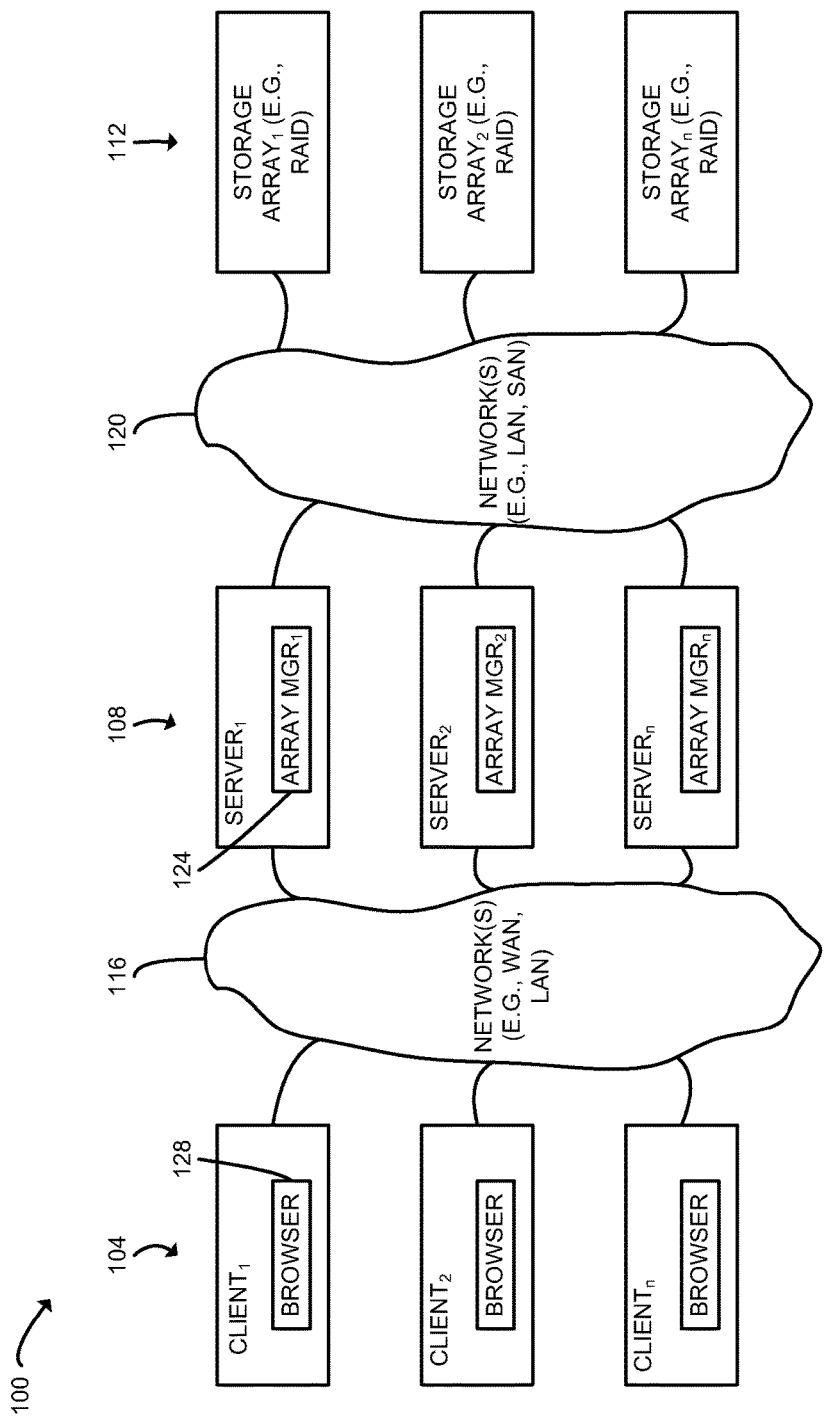
FIG. 1 is a block diagram of a storage networking model that provides storage array access to clients via servers over one or more networks.

Turning now to FIG. 1, a block diagram of a storage networking model 100 that provides storage array access to clients via servers over one or more networks is illustrated. Broadly, the storage model 100 may be made up of a plurality of client devices 104 (e.g., each running any appropriate operating system such as UNIX, NetWare, NT, Solaris, or the like), a plurality of servers 108 (e.g., mail servers, application servers, or database servers), and a plurality of storage arrays 112 (e.g., Fibre Channel arrays), which provide redundant and parallel storage capacity to the client devices 104 via the servers 108.

Each client device 104 may be interconnected or otherwise have access to one or more of the servers 108 (e.g., for use in configuring or taking other actions with respect to the storage arrays 112) via any appropriate network(s) 116 (e.g., LAN, WAN, Internet). Furthermore, each of the servers 108 may be interconnected or otherwise have access to one or more of the storage arrays 112 via any appropriate network(s) 120 (e.g., LAN, SAN). For instance, the network(s) 120 may be in the form of one or more LAN and/or SAN fabrics including any appropriate number and configuration of switches and the like that allow for communications between the servers 108 and the storage arrays 112.

One or more of the servers 108 may run an instance of any appropriate array manager 124 (e.g., software such as Oracle's CAM) that broadly serves to provide a common interface for most or all storage functions and facilitate out-of-band management and/or in-band management of one or more of the storage arrays 112. As just one example, a user may utilize a browser 128 running on a client device 104 to access an interface (e.g., user interface or command line interface) of the array manager 124 of one of the servers 108 and appropriately request to configure one or more of the storage arrays 112 (e.g., create a volume of a storage array 112). As part of requesting a configuration change of one or more of the storage arrays 112, a user is typically presented with a summary page or screen on the client device 104 (e.g., via the browser 128) that provides an indication of the current state (e.g., capacity allocations, volume usage, free space, health, status, and the like) of the various storage arrays 112 registered with the array manager 124 to allow the user to make a more informed decision regarding the particular configuration change. While each of the servers 108 has been illustrated as running an array manager 124, other embodiments envision that some servers 108 may actually utilize an array manager 124 running on another server 108 to manage the storage arrays 112.

As discussed above, previous and current array managers are generally required to separately communicate with each storage array to collect storage array configuration state information (e.g., in relation to volume usages, capacity allocations, versions, and the like) in order to prepare the summary page in response to the user requesting to configure or take other action with respect to the storage arrays. That is, upon a user requesting to reconfigure one or more of the storage arrays (e.g., provision storage space), current array managers subsequently reach out to each of the various storage arrays to obtain current configuration state information for such storage arrays at the time the request is made. However, substantial amounts of time and bandwidth are consumed as part of having to separately collect such state information from each storage array at the time the state information is needed. This leads to interface timeouts, an inability of users to view all state data on a single page, inconsistent results, long wait times, and the like. Such inefficiencies become more pronounced with an increasing number of storage arrays in the SAN or other type of storage network.

Figure 2:
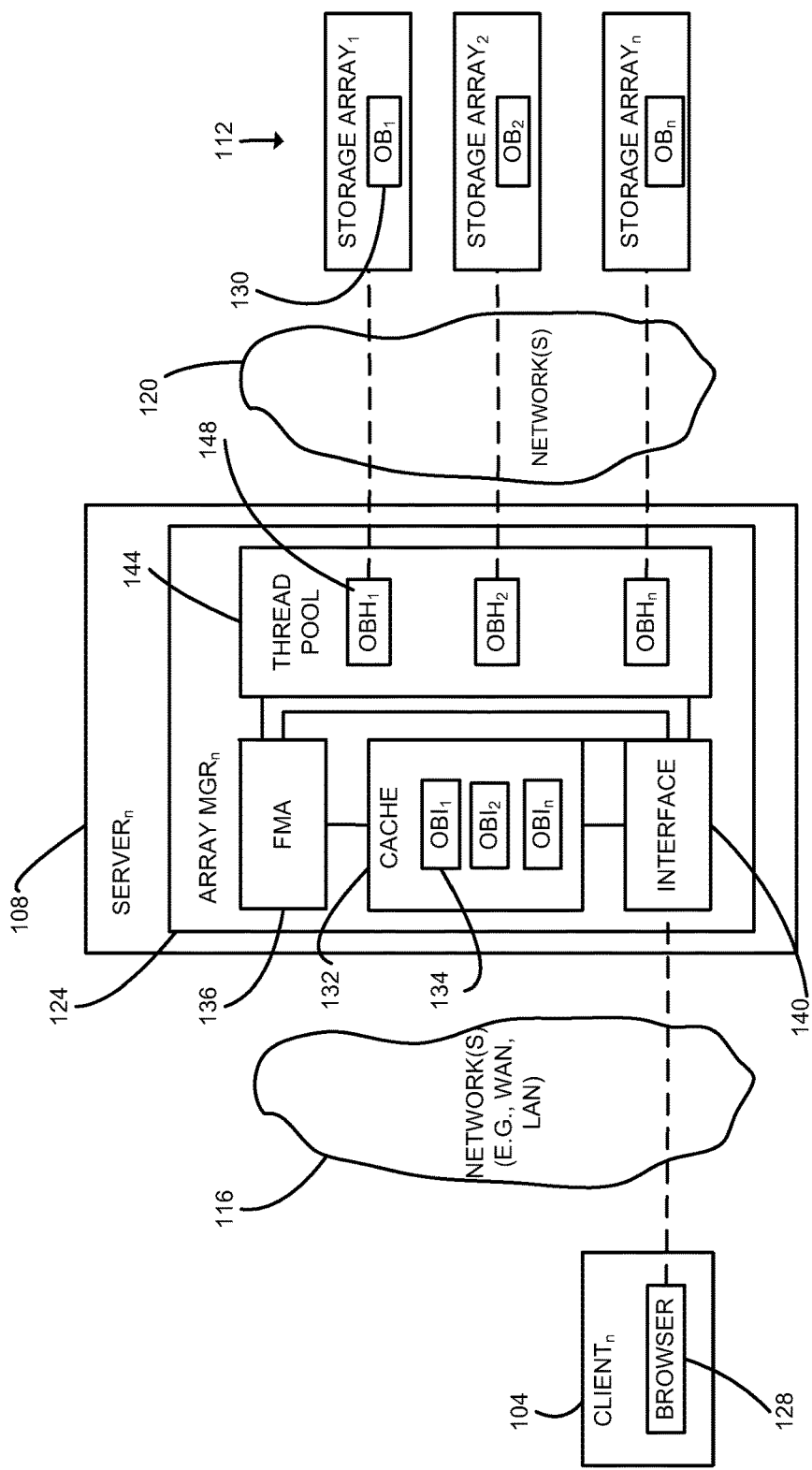
FIG. 2 is a block diagram that illustrates one of the servers of the model of FIG. 1 in more detail.

In this regard, and turning now to FIG. 2, one or more of the array managers 124 may store substantially current or up to date state information for the various storage arrays 112 (e.g., for storage arrays 112 registered with the array manager 124 and/or for other storage arrays) in a local, persistent, in-memory cache 132 (i.e., storage in quickly accessible memory of the server 108 on which the array manager 124 is implemented) that may be quickly accessed by any appropriate module to obtain a current state of one or more of the storage arrays 112. That is, instead of having to separately communicate with each storage array 112 to obtain current configuration state information for the storage arrays 112 (e.g., at the time at which generation of a state summary of all of the storage arrays 112 is desired), a module or component of the array manager 124 may simply access the local cache 132 to obtain such state information.

For instance, each storage array 112 may maintain current or up to date state information (e.g., in relation to configuration, health, and the like) in an "object bundle" (OB) 130 (e.g., $OB_1$, $OB_2$, $OB_n$, respectively, for Storage $Array_1$, Storage $Array_2$, Storage $Array_n$) which may be stored on any appropriate persistent data store (not shown) of the storage arrays 112. Upon a change in state of a storage array 112, any appropriate controller or module may function to update the OB 130 with the changed/new state information (e.g., adding the new information to the OB 130, writing over old information, and/or the like).

Furthermore, the array manager 124 may store a respective OB Instance (OBI) 134 (e.g., $OBI_1$, $OBI_2$, $OBI_n$) of each OB 130 in the cache 132. Each OBI 134 includes information representing a substantially current state of a respective storage array 112 (e.g., in relation to storage array configuration such as volumes, capacities, and the like, and, in some arrangements, additionally in relation to health, faults, status, and the like). As will be discussed more fully in the following description, each OBI 134 may be updated/refreshed in an event-driven manner that may be independent of the updating/refreshing of other OBIs 134 in the cache 132 and which may occur before the time at which the state information of the OBI 134 is needed by the array manager 124 (e.g., for preparing a storage array summary page). For instance, upon a user requesting and implementing a configuration change of a particular storage array 112 (e.g., creating a volume), the array manager 124 may request a copy of the current OB 130 of the particular storage array 112 (where the current OB 130 reflects the new configuration change) and store an OBI 134 of the current OB 130 in the cache 132 (e.g., overwriting the previous version of the OBI 134, updating only those portions of the previous OBI 134 that have changed, and/or the like). If, at some time later, the array manager 124 needs the current state information for the particular storage array 112 (e.g., as part of preparing a summary state information page for all of the storage arrays 112), the array manager 124 can simply retrieve the updated OBI 134 of the particular storage array 112 from the cache 132.

Before discussing the cache 132 and its interaction with other modules/components in more detail, reference will be made to other components of the array manager 124. As shown, the array manager 124 may include a Fault Management Application (FMA) 136 (e.g., fault management module) that broadly serves to provide automated diagnosis of faulty hardware (e.g., disk drive clusters) of the storage arrays 112, take proactive measures to correct such hardware-related faults (e.g., offlining a CPU), and/or the like. The FMA 136 generally runs in the background capturing telemetry and other related hardware/software errors until a diagnosis can be completed or a fault can be predicted. In one arrangement, the FMA 136 may be configured to automatically request and obtain certain types of fault management (FM) state information (e.g., health, over temperature alerts, and the like) from each of the various storage arrays 112 according to any desired schedule (e.g., every 5 minutes, every 15 minutes, or the like) and then appropriately store such information in the cache 132. In another arrangement, a storage array 112 (e.g. a controller of the storage array 112) may be configured to sense a fault (e.g., over temperature, failure, and the like) and then automatically send information related to the fault (e.g., asynchronous notifications) back to the FMA 136 which may store the information in the cache 132 in any appropriate manner. The obtained FM state information for each storage array 112 may be stored in the cache 132 as part of its respective OBI 134 and/or in the cache 132 but separate from its respective OBI 134 (e.g., in a table or another object in any appropriate manner).

The array manager 124 also may include at least one interface 140 (e.g., CLI or UI) that communicates with browser 128 (or other software component) on a client device 104 and allows a user to manipulate or otherwise make use of the array manager 124. For instance, administrators and troubleshooters can utilize a browser 128 of a client device 104 to access the FMA 136 via the interface 140 as part of fault management activities in relation to the storage arrays 112. As another example, users may utilize a browser 128 of a client device 104 to implement configuration changes of one or more of the storage arrays 112 via the interface 140.

With continued reference to FIG. 2, the array manager 124 may also include, or at least have access to, a thread pool 144. The thread pool 144 includes references to a plurality of threads or OB Handlers (OBH) 148. Each OBH 148 is specifically configured for a particular one of the storage arrays (e.g., $OBH_1$, $OBH_2$, $OBH_n$ for Storage $Array_1$, Storage $Array_2$, Storage $Array_n$, respectively). Broadly, each OBH 148 is operable to handle asynchronous notifications (e.g., in relation to faults) received from its particular storage array 112, maintain a current OBI 134 in the cache 132 for its particular storage array 112, and perform read and/or write operations on the particular storage array 112.

For instance, the FMA 136 may access a particular OBH 148 in the thread pool 144 to obtain updated state information for a particular storage array 112. As another example, the interface 140 may access a particular OBH 148 in the thread pool 144 to perform a write operation on a particular storage array 112 per commands from a user via a browser 128 on client device 104. While the thread pool 148 has been shown as being included as part of the array manager 124 (or its respective server 108) in FIG. 2, some arrangements envision that one or more of the array managers may access a thread pool 144 implemented as part of another array manager 124 on another server 108. In this regard, a plurality of array managers 124 of a particular storage networking model 100 may utilize a common thread pool 144.

Figure 3:
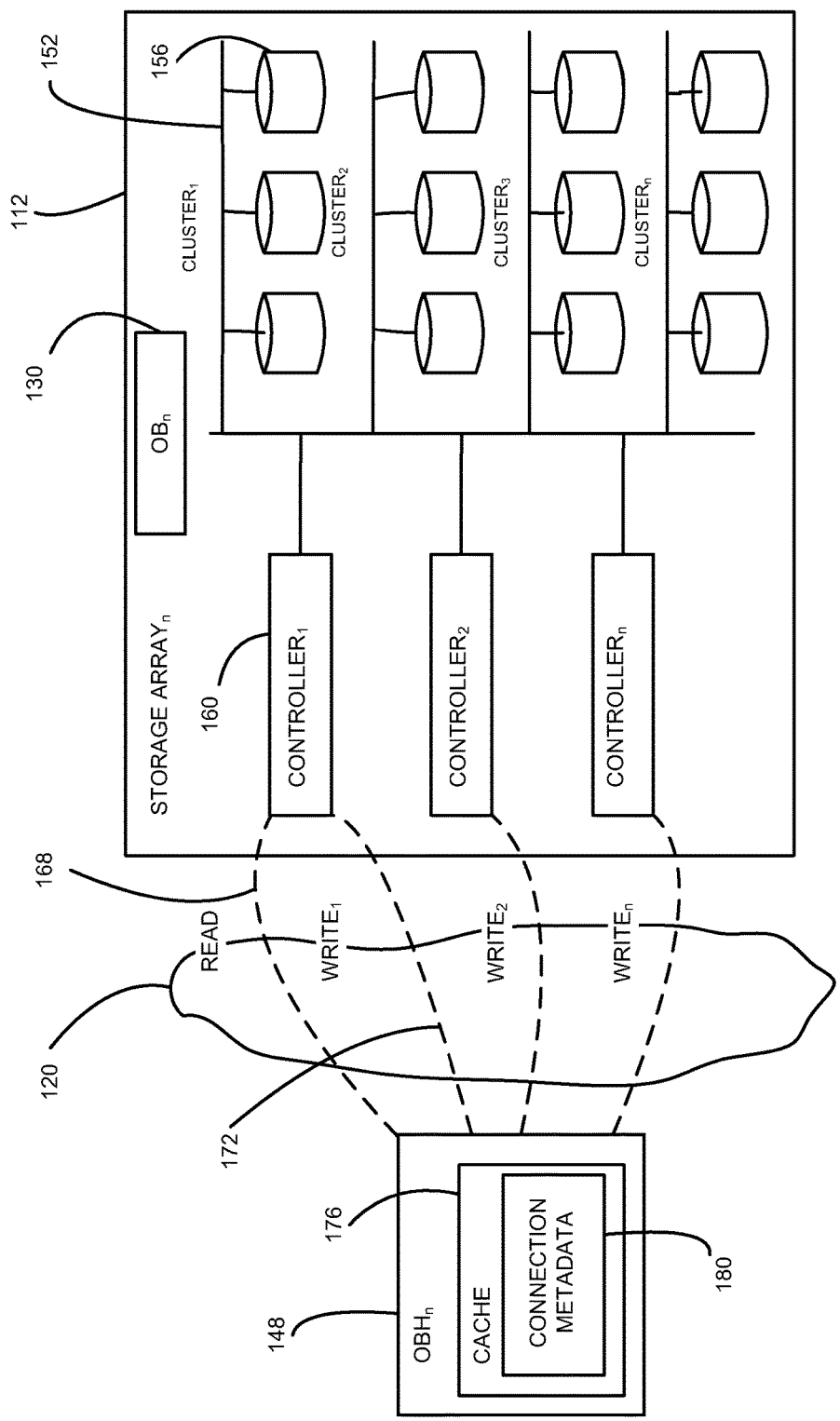
FIG. 3 is a block diagram illustrating various respective read and write connections that may be established between an object bundle handler corresponding to a storage array and the storage array.

With additional reference to FIG. 3, additional details relating to each storage array 112, a respective OBH 144, and separate and dedicated read and write connections between the same are illustrated. Each storage array 112 may generally be made up of a number of clusters 152 of disk drives 156 (e.g., RAIDs), which may be appropriately manipulated by a number of controllers 160. The controllers 160 may also be responsible for maintaining current or up to date state information in the OB 130. While not shown, it should be appreciated that the controllers 160, OB 130, and/or other components of the storage array 112 may be implemented or stored on one or more servers in communication with the clusters 152.

Again, the OBH 148 is generally responsible for facilitating read and write operations in relation to the storage array 112. As discussed above, previous and current array managers conduct read and write operations for a particular storage array over a common connection. Doing so often leads to various communication failures and delays due to all connections to a storage array becoming consumed, which prevents a desired operation from commencing (e.g., all connections to a particular storage array may become consumed by read operations thus preventing a write operation from occurring), and due to the continual setup and teardown of array connections. In this regard, the OBH 148 is configured to create a number of separate and distinct connections between the OBH 148 (and thus the array manager 124) and a particular storage array 112 for respective read and write operations between the array manager 124 and the storage array 112.

As seen in FIG. 3, the OBH 148 may create at least one persistent read channel or connection 168 with the storage array 112. The connection 168 may be used to handle asynchronous notifications (e.g., in relation to faults) received from the storage array 112 and maintain a current OBI 134 in the cache 132 for the storage array 112. While the read connection 168 is illustrated as being with $Controller_1$ 160 of the storage array 112, the read connection 168 may be with other modules or components of the storage array 112 (e.g., with $Controller_2$, $Controller_n$, and/or other modules) so long as the modules have access to the OB 130 and the ability to pass asynchronous notifications (e.g., in relation to faults) back to the array manager 124 over the read connection 168.

The OBH 148 may also create a number of write channels or connections 172, where each write connection 172 is established between the OBH 148 (and thus the array manager 124) and a particular controller 160 of the storage array 112. For instance, upon a user desiring to configure a particular disk drive 156 (e.g., create a volume, edit data) of a particular storage array 112, the interface 140 of the array manager 124 may select the appropriate OBH 148 from the thread pool 144 which serves to establish a write connection 172 with a corresponding controller 160 of the storage array 112 responsible for configuring or otherwise managing the particular disk drive 156 and/or its cluster 152. Advantageously, the operations performed over the write connections 172 may be substantially unaffected by those occurring over the read connection(s) 168 and vice versa. The OBH 148 may utilize IP addresses of the storage array 112 as supplied by the FMA 136 for use in establishing the read and write connections 168, 172.

The OBH 148 may include or be associated with a cache 176 that may be used to store metadata 180 corresponding to the various read and/or write connections 168, 172. For instance, upon initially establishing write connections 172 with the various respective controllers 160, the OBH 148 may store metadata 180 (e.g., IP address and/or the like) for each of the write connections 172 (e.g., $Write_1$, $Write_2$, $Write_n$) in the cache 176 (e.g., indexed by controller number or ID). Thereafter, subsequent writes to one or more of the controllers 160 via the write connections 172 may be sped up or otherwise facilitated with the metadata 180 (e.g., by avoiding or limiting the need to go through the steps necessary to open a new connection, such as having to newly open a socket at a specific symbol port). Upon occurrence of a connection time out or other type of exception or dropped connection, the OBH 148 may clean both the particular write connection 172 and its respective metadata 180 in the cache 176.

Figure 4:
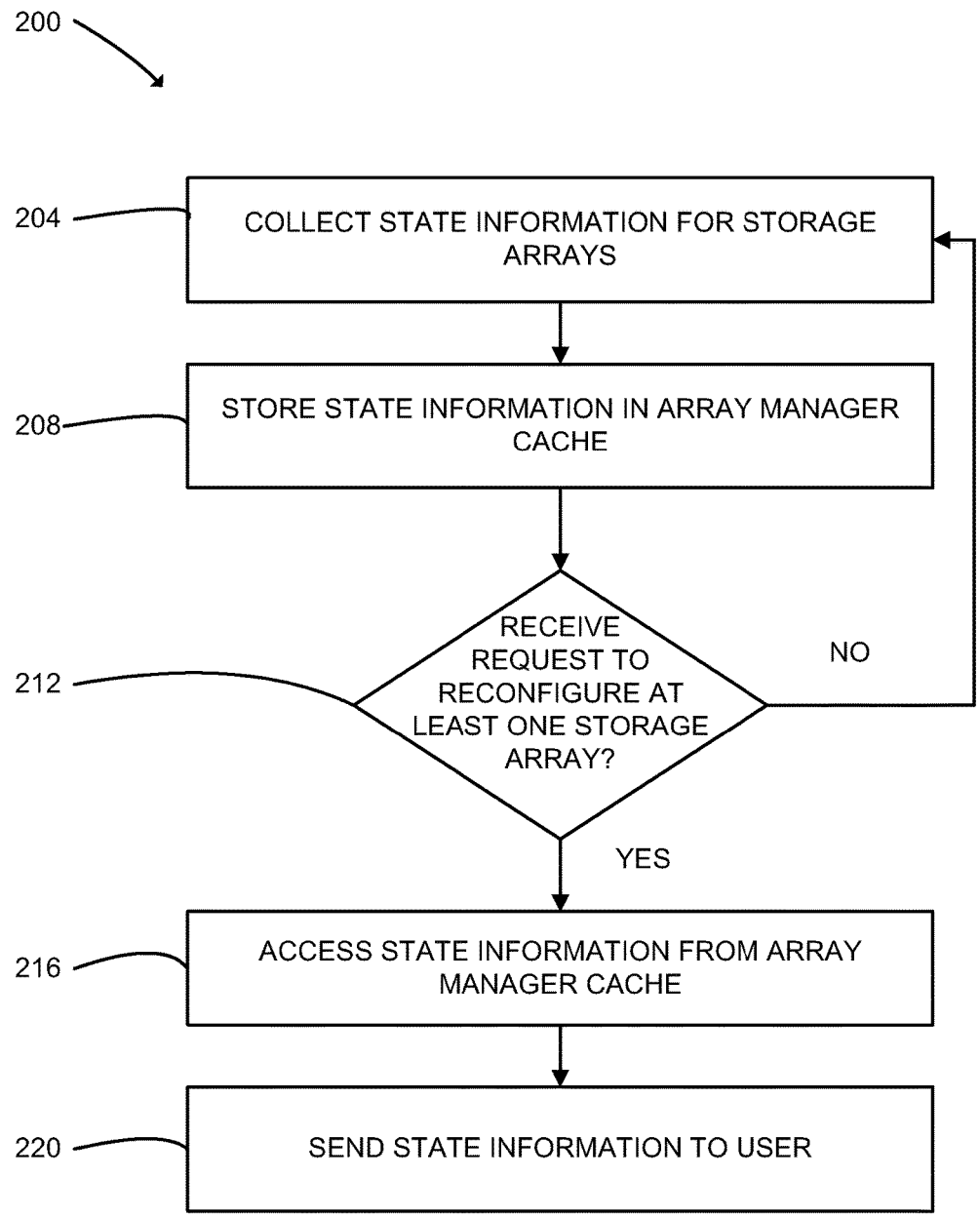
FIG. 4 is a flow diagram illustrating steps that may be performed as part of maintaining a local cache of an array manager with storage array state information, where the local cache may be accessed by the array manager to provide a storage array summary to a user via a client browser.

Turning now to FIG. 4, a flow diagram showing one method 200 for use in managing a plurality of storage arrays in a SAN or other type of storage network is illustrated. In conjunction with a discussion of the method 200, reference will also be made to FIGS. 1-3 to facilitate the reader's understanding of the method 200. At 204, state information may generally be collected from one or more storage arrays 112 of a storage model 100 and appropriately stored 208 in a local cache 132 accessible by an array manager 124. With reference to FIGS. 2-3, for instance, the array manager 124 may utilize OBHs 148 of thread pool 144 to obtain state information from respective storage arrays 112 via respective read connections 168 (e.g., via asynchronous notifications from storage arrays 112 in relation to fault conditions and/or via polling a storage array 112 for a current copy of the OB 130 of the storage array 112). Steps 204 and 208 may be generally thought of as state information collection and storage processes substantially continuously going on in the background of an array manager 124 as opposed to necessarily upon generation of a storage array summary page or the like.

With reference again to FIG. 4, the method 200 may query 212 whether a request has been received to reconfigure at least one storage array 112. For instance, a user may access interface 140 of array manager 124 via a browser 128 of a client device 104 over network(s) 116 to add a volume to, edit data in, and/or the like for a particular storage array 112. Responsive to a negative answer to the query at 212, the method 200 may flow back to 204 and 208 to continue to collect and store state information for storage arrays 112 of the storage model 100. If a reconfiguration request has been received (e.g., at interface 140 of array manager 124), the method 200 may proceed to access 216 storage array state information from a local array manager cache 132 and send the state information to a user.

That is, and in contrast to previous arrangements whereby an array manager 124 would separately reach out to each of the storage arrays 112 (e.g., via network(s) 120) to obtain current state information for the storage arrays for use in preparing a summary page to be sent to a user for presentation on a client device (and the associated complications in relation to slow rendering of the summary page due to communication delays, inconsistent results, and the like), the present method 200 retrieves the state information for the various storage arrays 112 of the storage model 100 from the local and quickly accessible cache and sends 220 the same to a user (which may be presented in the form of a storage array summary). For instance, the interface 140 may retrieve copies of each of the various, substantially up to date OBIs 134 from the cache 132 and utilize the OBIs 134 to generate the summary page or otherwise send the state information to the client device 104. The substantially up to date state information can be utilized by a user as part of determining in what manner one or more storage arrays 112 are to be configured.

Figure 5:
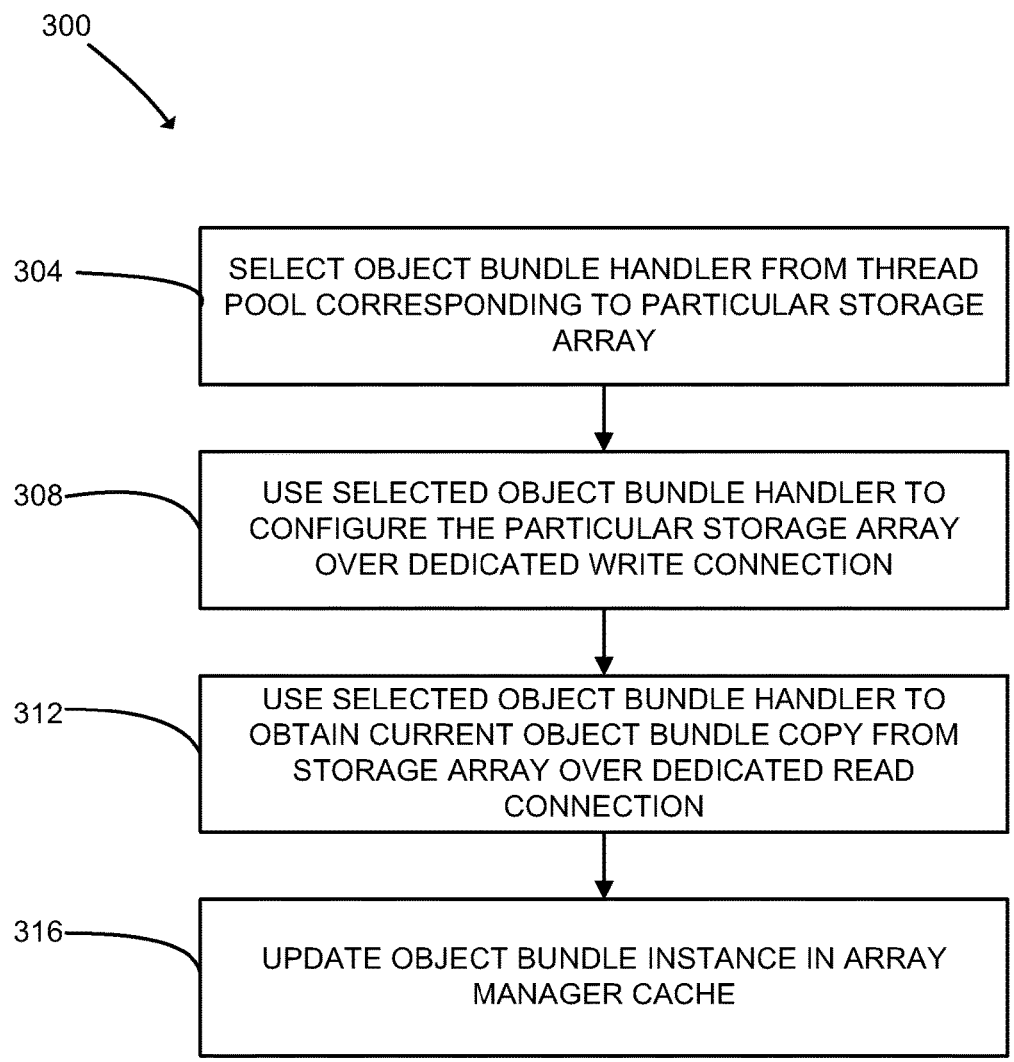
FIG. 5 is another flow diagram illustrating steps that may be performed to both configure and subsequently obtain current state information from a storage array which may be used to update the local cache of FIG. 4.

FIG. 5 is a flow diagram illustrating another method 300 for use in managing storage arrays of a storage model. At 304, an OBH 148 may be selected from a thread pool 144, where the OBH 148 is configured to establish communications with or otherwise corresponds to a particular storage array 112. For instance, imagine that after viewing a storage array summary page on a client device 104 (e.g., generated via the method 200 of FIG. 4), a user opts to add a volume to a particular cluster 152 of a storage array 112. The interface 140 may then access the thread pool 144 and select the OBH(s) 148 corresponding to the storage array(s) that the user wants to configure/reconfigure. See FIG. 2.

The method 300 may then include using 308 the selected OBH 148 to configure the particular storage array(s) 112 in the manner desired by the user. For instance, step 308 may entail initially accessing the OBH cache 176 and determining whether connection metadata exists 180 for a write connection 172 to a controller 160 corresponding to the cluster 152 or disk drive 156 of the storage array 112 that the user wants to configure/reconfigure. In the event that appropriate connection metadata 180 exists, the OBH 148 utilizes the same to configure the storage array 112 via the corresponding write connection 172. See FIG. 3. Otherwise, the OBH 148 creates a new write connection 172 to the corresponding controller 160 and stores corresponding connection metadata in the OBH cache 176.

In one arrangement, the OBH 148 may be configured to "probe" a particular storage array 112 to determine whether the storage array 112 is available before attempting to establish a read and/or write connection 168, 172 with it. For instance, before establishing a write connection 172 with a particular controller 160 of a particular storage array 112, the array manager 124 may probe the controller 160 using a standard API (e.g., a standard Java API) to initially determine whether the storage array 112 is online or otherwise available. If the storage array 112 is available, the array manager 124 may then proceed to establish a write connection 172 with the controller 160 (e.g., using a storage array vendor-specific API).

If the storage array 112 (or its controllers 160) is not available, the array manager 124 may then proceed to probe additional storage arrays 112 (e.g., with the standard API) to determine whether such additional storage arrays 112 are available and then appropriately establish write connections 160 depending upon the availability. Significant quantities of time can be saved by quickly and initially probing a storage array 112 and determining whether the array is unavailable (e.g., 2-4 seconds) as opposed to proceeding directly to attempting establishment of a read/write connection with a particular storage array 112 and then waiting for the connection to fail (e.g., 10 or more seconds). For instance, an array manager 124 can move much more quickly through a long list of storage arrays when several of the arrays may be experiencing network communication failures.

With continued reference to FIG. 5, the method 300 may include using 312 the selected OBH 148 to obtain a copy of the current OB(s) 130 from at least one storage array 112 that was just configured/reconfigured via the write connection(s) 172. As mentioned previously, each storage array 112 has any appropriate logic or the like that serves to maintain current state information in its respective OB 130 upon changes in state of the storage array (e.g., configuration, health, and the like). In one arrangement, the storage array 112 may signal or otherwise notify the array manager 124 of a change or update in its OB 130. In any event, the interface 140 may in some arrangements then appropriately signal (e.g., message) the FMA 136 to request and obtain a copy of the current OB 130 from the particular storage array 112 over a corresponding read connection 168 via the corresponding OBH 148.

The array manager 124 may retrieve the current OB 130 from the particular storage array 112 for refreshing the cache 132 in a manner that is configuration event-driven rather than driven by the time the information in the cache 132 is actually needed (e.g., for preparing a summary page). In this way, the cache 132 may be configured to substantially always maintain current or up to date information for the various storage arrays 112 which is quickly accessible to array manager 124 or other components of the storage model 100.

The method 300 may then include updating 316 the OBI 134 of the particular storage array 112 in the array manager cache 132. See FIGS. 2-3. For instance, the updating 316 may include overwriting or otherwise storing a copy of the current/updated OB 130 received from the storage array 112 over the read connection 168 in the cache. In the event that multiple copies of the OB 130 exist in the cache 132, the interface 140 or other module accessing the OBIs 134 in the cache 132 for presentation to a user (e.g., as part of a storage array state summary page) or for other purposes may be appropriately designed to select the most recent OBI 134 for each particular storage array 112 (e.g., as identified by a time stamp or other metadata tagged to the OBI 134).

It will be readily appreciated that many deviations may be made from the specific embodiments disclosed in the specification without departing from the spirit and scope of the invention. Also, it should be understood that the functionalities performed by many of the processes and modules discussed herein may be performed by other modules, devices, processes, etc. The illustrations and discussion herein has only been provided to assist the reader in understanding the various aspects of the present disclosure. Furthermore, one or more various combinations of the above discussed arrangements and embodiments are also envisioned.

Embodiments disclosed herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. Each of the client devices 104, servers 108 and storage arrays 112 may encompasses one or more apparatuses, devices, and machines for processing data, including by way of example a programmable processor, a computer, or multiple processors or computers. In addition to hardware, the storage model 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (e.g., the dynamic consumption cost determination and associated resource scheduling disclosed herein) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described. Furthermore, the flow diagrams disclosed herein have merely been presented as examples of manners in which the present teachings can be implemented and do not in all cases necessarily require all the disclosed steps and/or the particular order in which the steps have been presented.

In different embodiments, distributed computing environment may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer (e.g., client system 108 in FIG. 1) having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method, comprising:
   collecting at an array manager, over at least a first network, state information about a configuration of at least one storage array in a plurality of storage arrays, wherein the collecting includes:
      selecting, from a thread pool comprising a plurality of storage array handlers accessible to the array manager, a handler corresponding to the at least one storage array; and
      using the selected handler to obtain the storage array state information, wherein the using includes establishing a read connection between the selected handler and the at least one storage array via the first network and obtaining the storage array state information over the read connection; and
   storing the storage array state information of the at least one storage array in a cache of the array manager, for later communication over a second network to a user, wherein the storing comprises storing the storage array state information of the at least one storage array as an instance of a respective object bundle of storage array state information as stored at the at least one storage array.

2. The method of claim 1, wherein the collecting includes:
   obtaining the storage array state information in response to a configuration change of the at least one storage array.

3. The method of claim 2 wherein the configuration change comprises at least one of an added volume, an updated volume, an edited volume, a deleted volume, a storage allocation, and an updated version.

4. The method of claim 1, wherein the collecting includes:
   transmitting to the at least one storage array, from the array manager, a request for current state information for the at least one storage array; and
   obtaining, in response to the transmitting, the storage array state information.

5. The method of claim 1, further including:
   collecting at the array manager state information about a configuration of a second storage array in the plurality of storage arrays; and
   storing the storage array state information of the second storage array in the array manager cache, for later communication to a user, wherein the storing comprises storing the storage array state information of the second storage array as an instance of a respective object bundle of storage array state information as stored at the second storage array.

6. The method of claim 5, wherein the collecting and storing of the storage array state information for the at least one storage array occurs independently of the collecting and storing of the storage array state information for the second storage array.

7. The method of claim 1, wherein the storing includes:
   overwriting a previous instance of the object bundle.

8. The method of claim 1, wherein the storing includes:
   storing a plurality of instances of the object bundle as stored at the at least one storage array.

9. The method of claim 8, further including:
   accessing a most recent one of the plurality of instances from the array manager cache; and
   sending the storage array state information of the most recent one of the plurality of instances over the second network for presentation to the user.

10. The method of claim 1, further including:
accessing the instance from the array manager cache; and
sending the storage array state information of the instance over the second network for presentation to the user.

11. The method of claim 10, wherein the accessing is responsive to receiving at the array manager a request to configure the at least one storage array.

12. The method of claim 1, wherein the storage array state information comprises at least one selected from the group consisting of volume information, capacity information, health information, and fault information.

13. A non-transitory, computer-readable storage medium, storing program instructions that when executed on a computer cause the computer to perform:
collecting at an array manager, over at least a first network, state information about a configuration of each of a plurality of storage arrays of a storage area network;
storing the storage array state information of the plurality of storage arrays in a cache of the array manager as a respective plurality of instances of object bundles of storage array state information as stored at the plurality of storage arrays;
making the storage array state information available for transmission to a user over a second network;
accessing a most recent one of the plurality of instances of one of the object bundles from the array manager cache; and
sending the storage array state information of the most recent one of the plurality of instances of the one of the object bundles over the second network for presentation to the user.

14. The non-transitory, computer-readable storage medium of claim 13, wherein the program instructions that when executed on the computer cause the computer to perform the collecting of the storage array state information for one of the plurality of storage arrays do so independently of the collecting of the storage array state information for another of the plurality of storage arrays.

15. The non-transitory, computer-readable storage medium of claim 13, wherein the program instructions that when executed on the computer cause the computer to perform the collecting of the storage array state information for one of the plurality of storage arrays do so before a request for configuring the one of the plurality of storage arrays is received at the array manager.

16. The non-transitory, computer-readable storage medium of claim 13, wherein the program instructions that when executed on the computer cause the computer to perform the collecting of the storage array state information include program instructions that when executed on the computer cause the computer to perform:
transmitting to the plurality of storage arrays requests for current state information for the plurality of storage arrays; and
obtaining, in response to the transmitting, the storage array state information.

* * * * *

UNITED STATES PATENT AND TRADEMARK OFFICE
CERTIFICATE OF CORRECTION

PATENT NO. : 10,216,426 B2
APPLICATION NO. : 15/355966
DATED : February 26, 2019
INVENTOR(S) : Zuluaga et al.

It is certified that error appears in the above-identified patent and that said Letters Patent is hereby corrected as shown below:

In the Specification

In Column 13, Line 53, delete "sub combination." and insert -- subcombination. --, therefor.

Signed and Sealed this
Fourth Day of February, 2020

Andrei Iancu
*Director of the United States Patent and Trademark Office*